(12) United States Patent
Baudart et al.

(10) Patent No.: US 8,939,497 B2
(45) Date of Patent: Jan. 27, 2015

(54) DASHBOARD CROSSBEAM COMPRISING AT LEAST TWO SECTIONS ATTACHED TO EACH OTHER BY WELDING

(75) Inventors: Laurent Baudart, Fresnoy en Thelle (FR); Serge Da Costa Pito, Cergy (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/607,052

(22) Filed: Sep. 7, 2012

(65) Prior Publication Data

US 2013/0241235 A1 Sep. 19, 2013

(30) Foreign Application Priority Data

Sep. 9, 2011 (FR) ...................... 11 58026

(51) Int. Cl.
*B62D 25/14* (2006.01)
*B62D 65/02* (2006.01)

(52) U.S. Cl.
CPC .............. *B62D 25/147* (2013.01); *B62D 65/02* (2013.01); *B62D 25/145* (2013.01)
USPC .................................. 296/193.02

(58) Field of Classification Search
USPC ................ 296/193.02, 70; 219/635; 280/779; 403/292
See application file for complete search history.

(56) References Cited

U.S. PATENT DOCUMENTS

| | | | |
|---|---|---|---|
| 6,391,470 B1 | 5/2002 | Schmieder et al. | |
| 6,688,000 B2 * | 2/2004 | Wang et al. | 29/897.2 |
| 7,658,439 B2 * | 2/2010 | Meier | 296/193.02 |
| 2003/0088983 A1 | 5/2003 | Wang et al. | |
| 2005/0071975 A1 | 4/2005 | Ni et al. | |
| 2009/0152865 A1 * | 6/2009 | Zuber et al. | 285/288.11 |
| 2010/0052366 A1 | 3/2010 | Schmieder et al. | |
| 2010/0237639 A1 * | 9/2010 | Handing et al. | 293/132 |

FOREIGN PATENT DOCUMENTS

| | | |
|---|---|---|
| DE | 19915381 A1 | 10/2000 |
| DE | 19935654 A1 | 2/2001 |
| DE | 102008045914 | 3/2010 |
| DE | 102009039167 A1 | 3/2011 |
| EP | 0990578 A2 | 4/2000 |
| FR | 1525045 | 5/1968 |

OTHER PUBLICATIONS

French Search Report for FR 1158026 dated Jan. 30, 2012, 3 pages.

\* cited by examiner

*Primary Examiner* — Joseph D Pape
*Assistant Examiner* — Dana Ivey
(74) *Attorney, Agent, or Firm* — Reising Ethington P.C.

(57) ABSTRACT

The crossbeam according to the invention comprises at least two sections, each section comprising at least one wall and being assembled to the other section in a junction region so as to form said crossbeam. The walls of said sections are fastened to each other by a weld made by induction brazing.

20 Claims, 4 Drawing Sheets

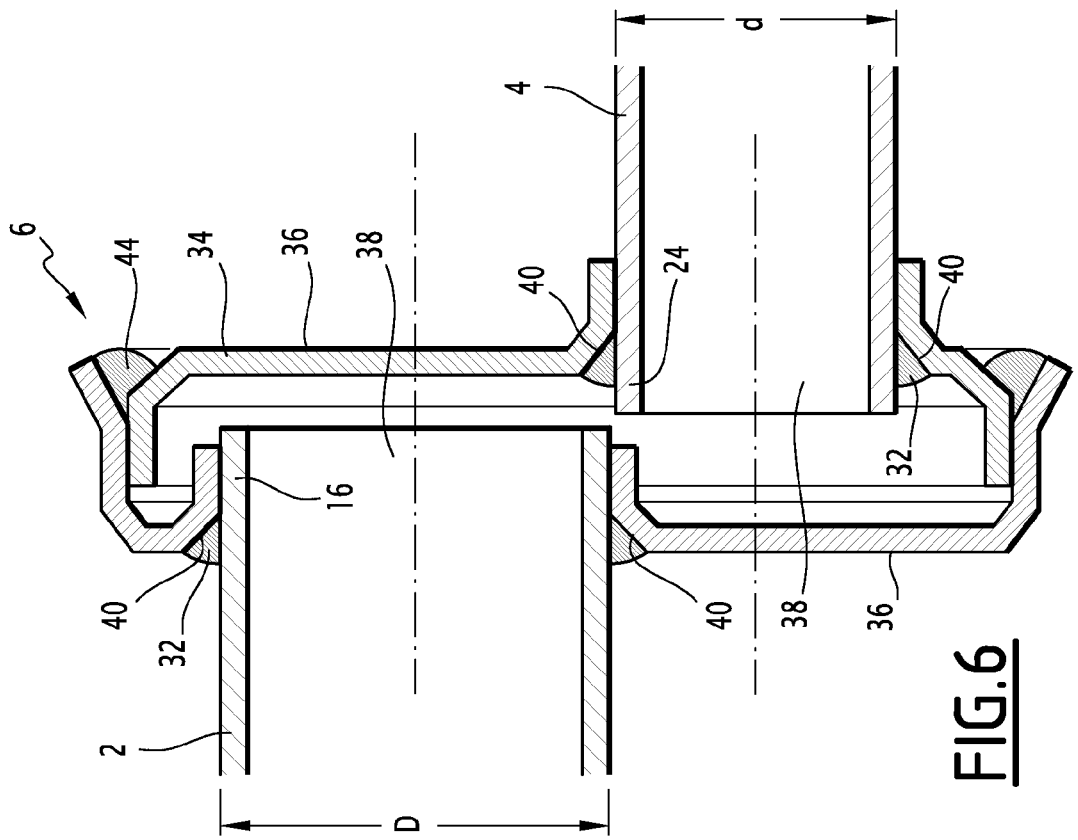
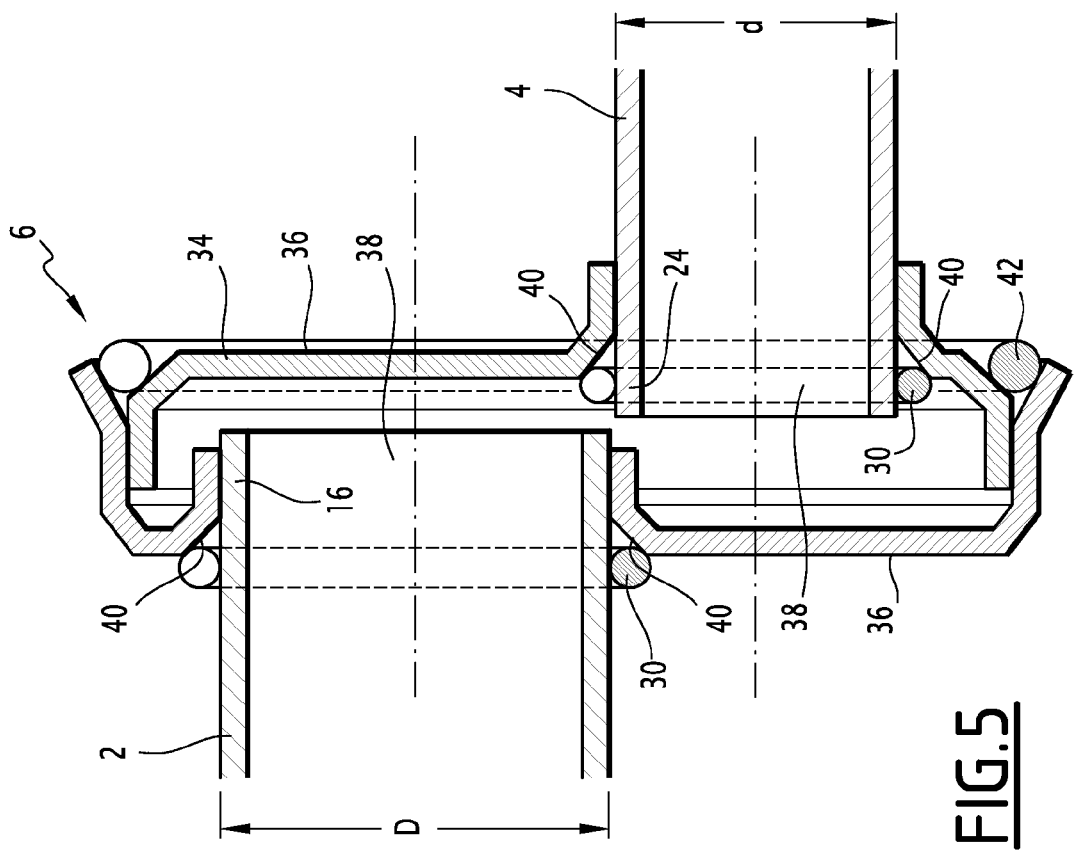

DASHBOARD CROSSBEAM COMPRISING AT LEAST TWO SECTIONS ATTACHED TO EACH OTHER BY WELDING

TECHNICAL FIELD

The present invention relates to multi-sectional vehicle dashboard crossbeams and to methods for producing these crossbeams.

BACKGROUND

It is known to make vehicle dashboard crossbeams from several sections assembled to each other. Such a structure makes it possible to adapt the dashboard crossbeam to its environment by selecting sections that are adapted, in terms of materials, geometry, mechanical properties, etc., to the zone in which those sections are designed to extend in the dashboard. Thus, the section designed to support the steering column of the vehicle will for example be more rigid than an adjacent section designed for another function. The first section will therefore be made from substantially heavier and bulkier appropriate materials than the second section. Such a structure thereby makes it possible to reduce the mass and bulk of the crossbeam by providing light and thin sections in areas where the rigidity stresses are lower.

It is known to assemble the sections together by laser or electric arc welding (Mag welding). However, such methods for assembling the sections are not satisfactory. In fact, it is difficult and expensive to produce continuous weld lines extending over the entire periphery of the sections in their junction region with another section. The fastening is therefore only done by weld points, which reduces the rigidity of the crossbeam and junction regions and decreases the performance of the crossbeam. These methods are not adapted to sections having small wall thicknesses, for example smaller than 1.2 mm, which limits the mass savings that may be obtained by reducing the thickness of the sections. Furthermore, these methods cause a significant increase in the temperature of the materials used to produce the sections when the sections are welded together. Such an increase may cause deformations of the sections, which leads to defects in the desired geometry of the crossbeam, as well as degradation of the mechanical properties of the crossbeam. Lastly, laser welding or Mag welding causes molten metal projections, which are dangerous for the operators performing the welding or located around the crossbeam being assembled.

SUMMARY

One of the aims of the invention is to offset the aforementioned drawbacks by proposing a crossbeam whereof the sections can have a smaller thickness and guaranteeing good performance in terms of mass, mechanical properties, vibratory behavior, rigidity, etc. at a lower production cost.

To that end, the invention relates to a crossbeam of the aforementioned type, in which the walls of said sections are attached to one another by welding done by induction brazing.

The welding, done by induction brazing, makes it possible to weld sections whereof the wall thickness is small, without harmfully increasing the materials used to produce the sections and without projecting materials that are hazardous for operators.

Embodiments of the invention may include one or more of the following features:

the sections have different wall thicknesses;

the thickness of the wall of at least one of the sections is smaller than 1.2 mm;

the end fastening portions to each other;

one of the end fastening portions comprises a flare at the end thereof, said end portion being fitted onto the other end portion such that part of the wall of the other end portion extends opposite said flare, the weld extending between said flare and said wall portion;

each fastening section is fastened by at least one weld done by induction brazing to a fastening plate forming the junction region;

the fastening plate comprises two flanges, each flange comprising an opening for receiving an end fastening portion of the section, the end fastening portion of the section being fastened in said opening by at least one weld done by induction brazing, said flanges (36) being fastened to one another by a weld (44) done by induction brazing;

the end fastening portion of one of the sections has a different cross-section than the end fastening portion of the other section, the crossbeam comprising at least one additional section extending in the junction region, said additional section having a first end fastening portion with a cross-section complementary to the cross-section of the end fastening portion of one of the sections and a second end fastening portion with a cross-section complementary to the cross-section of the end fastening portion of the other section, the sections being fastened to the additional section by welds done by induction brazing;

the sections are substantially tubular and extend substantially along a same axis;

the sections are substantially tubular and extend along non-aligned axes, substantially parallel to one another; and the welding done by induction brazing is continuous and extends over the entire wall of the sections in the junction region.

The invention also relates to a method for producing a crossbeam as described above, comprising the following steps:

providing at least two crossbeam sections, fastening the two sections to each other by at least one weld, the weld being done by induction brazing.

According to another feature of the production method as defined above, it comprises a step for arranging a weld ring around the end fastening portion of one of the sections in the junction region and a step for melting said weld ring so as to make the weld fastening the sections to each other.

BRIEF DESCRIPTION OF THE DRAWINGS

Other aspects and advantages of the invention will appear upon reading the following description, provided as an example and done in reference to the appended drawings, in which:

FIG. 5 is a diagrammatic cross-sectional illustration of the junction region between two crossbeam sections before those sections are welded together, according to still another crossbeam geometry, FIG. 6 is a diagrammatic cross-sectional illustration of the junction region of FIG. 5 after the sections are welded to each other.

DETAILED DESCRIPTION OF THE ILLUSTRATED EMBODIMENTS

Figure 1:
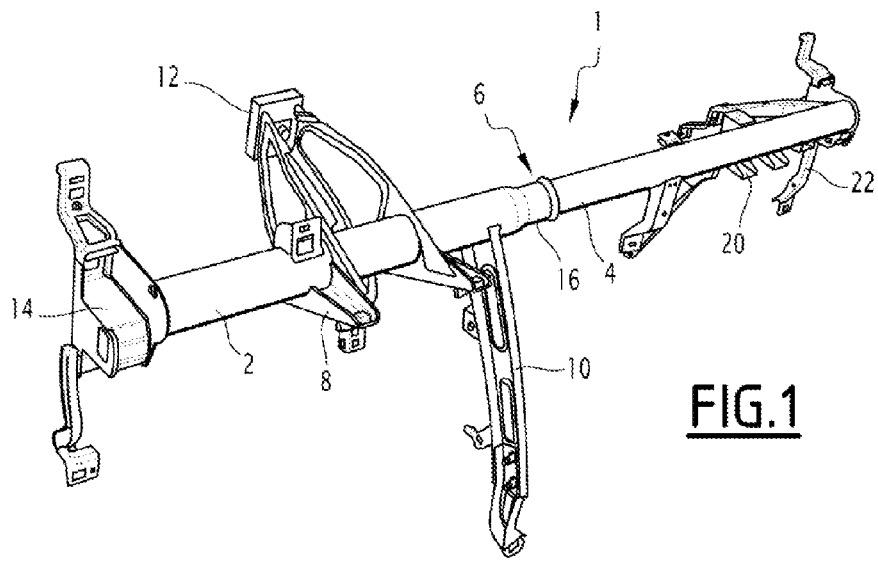
FIG. 1 is a diagrammatic perspective view of a dashboard crossbeam, according to one example of the geometry of the crossbeam.

In reference to FIG. 1, a motor vehicle dashboard crossbeam 1 is described comprising a first section 2 and a second section 4 fastened to each other in a junction region 6. The crossbeam shown in FIG. 1 is only one example of a possible geometry, as will be described later.

In the case of a motor vehicle, the first section 2 is for example designed to extend across from the driver of the vehicle. The first section 2 then forms a support for a steering column fastening device 8 and a brace 10 connecting the crossbeam 1 to the chassis of the vehicle. Other technical interfaces may be provided, such as a connecting pad 12, connecting the lower bay crossbeam and the dashboard crossbeam 1 of the vehicle and a fastening interface 14 of the end portion of the crossbeam 1 to a front hinge pillar of the vehicle. Thus, according to this example, the first section 2 must have a high rigidity and be able to bear the elements mentioned above. To that end, the first section 2 is for example formed from a steel tube with a large diameter D, for example between 50 mm and 70 mm.

The end portion of the first section 2 designed to be fastened to the second section 4 forms an end fastening portion 16 and extends in the junction region 6. According to the embodiment shown in FIGS. 1 to 4, the end fastening portion 16 of the first section 4 has a diameter smaller than the rest of the first section, for example between 30 mm and 50 mm, and comprises a flare 18 at its end, widening its diameter. According to the embodiment shown in FIGS. 1, 2 and 3, the tubular end fastening portion 16 extends along the same axis A as the rest of the first section 2. According to the embodiment shown in FIG. 4, the tubular end fastening portion 16 extends along an axis B that is offset in relation to the axis A of the rest of the first section 2 and parallel thereto.

According to the above example, the second section 4 is for example designed to extend across from the front passenger of the motor vehicle. The second section 4 for example forms a support for a device 20 for fastening an airbag housing and a fastening interface 22 for fastening to the other front hinge pillar of the vehicle. Other technical interfaces may be provided on the second section 4. The rigidity constraints are smaller for the second section 4 than the first section 2. Thus, the second section 4 can be made from a lighter material than the one used for the first section 2, such as aluminum or others, and have a smaller diameter d, for example between 30 mm and 50 mm, than that of the first section 2, so as to save on mass and bulk.

The end portion of the second section 4 designed to be fastened to the first section 2 forms an end fastening portion 24 and extends in the junction region 6. According to the embodiment shown in the figures, the end fastening portion 24 extends in the extension of the rest of the second section 4 and has a tubular shape with the same axis as the rest of the second section 4. According to the embodiment shown in FIGS. 1 to 3, the second section 4 extends along the axis A, i.e. the second section 4 is coaxial to the first section 2. According to the embodiment shown in FIG. 4, the second section 4 extends along the axis B, i.e. extends along an axis not aligned with the axis A of the first section 2, parallel to the axis A.

Figure 2:
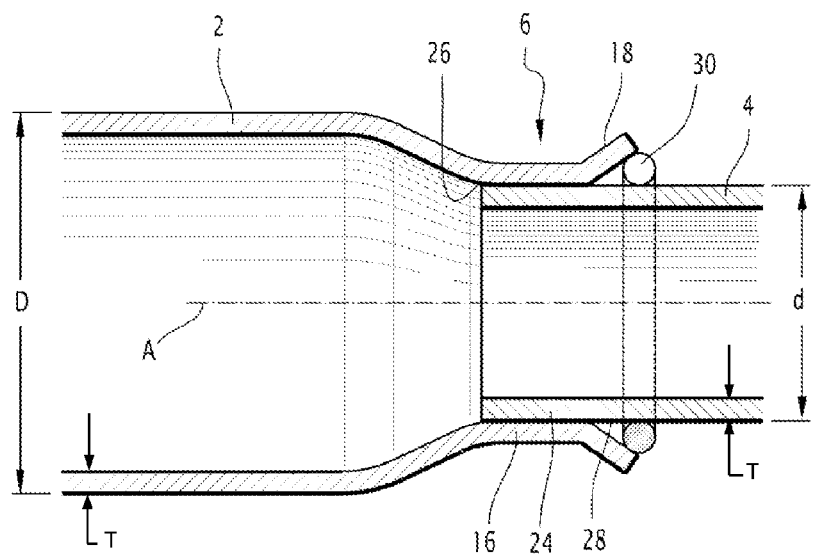
FIG. 2 is a diagrammatic cross-sectional illustration of the junction region between two crossbeam sections before those sections are welded to each other, according to the crossbeam geometry of FIG. 1.
Figure 3:
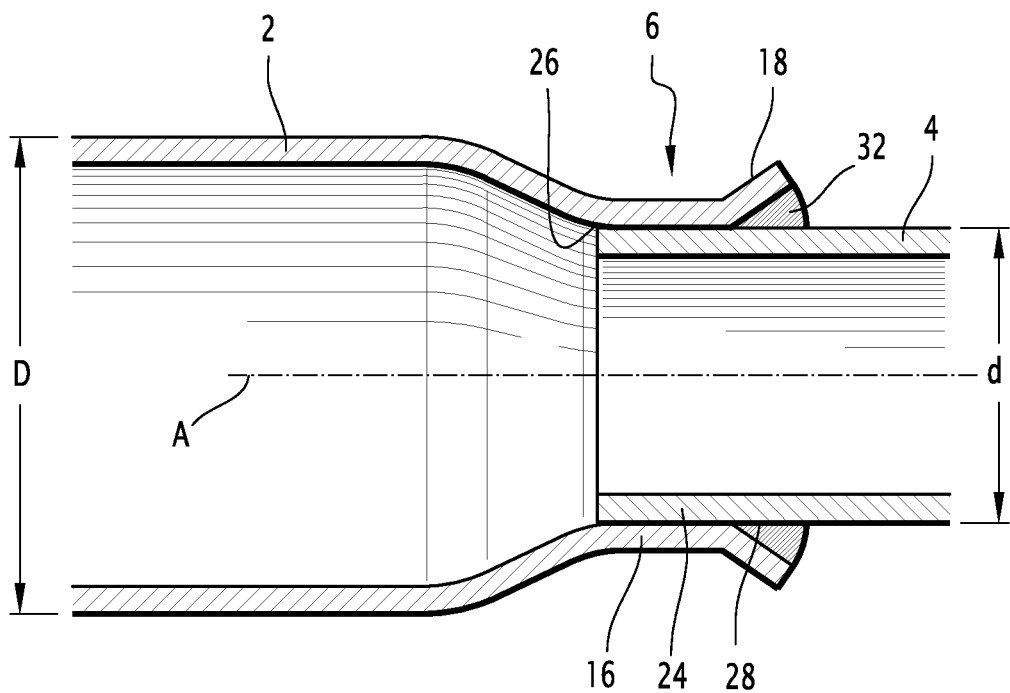
FIG. 3 is a diagrammatic cross-sectional illustration of the junction region of FIG. 2 after welding the sections to each other.
Figure 4:
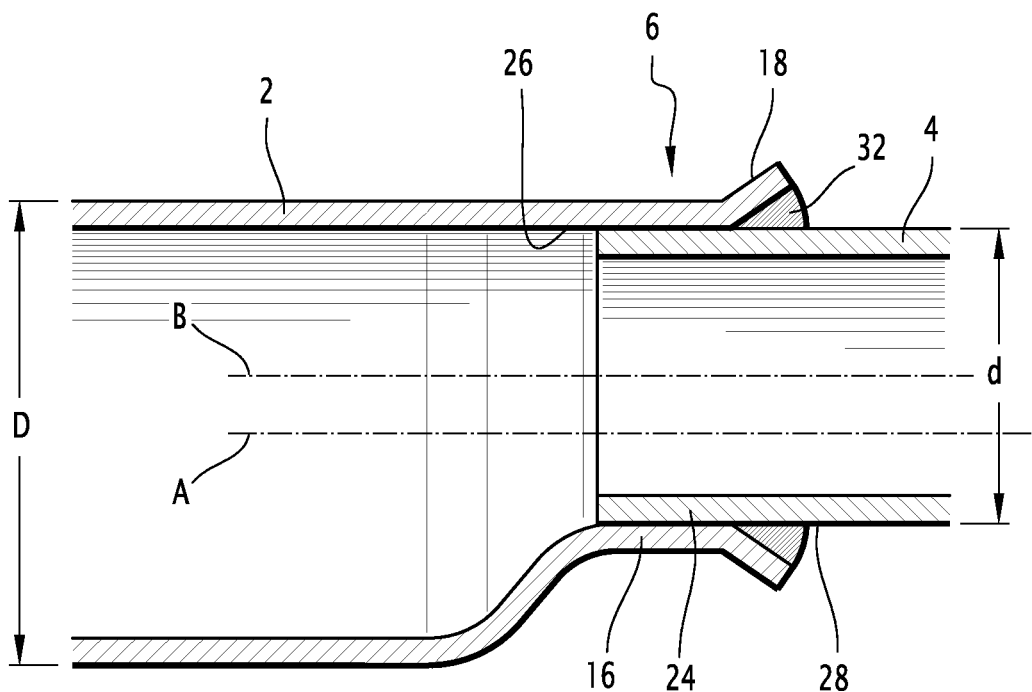
FIG. 4 is a diagrammatic cross-sectional illustration of the junction region between two crossbeam sections after welding the sections to each other, according to another crossbeam geometry.

According to the embodiment shown in FIGS. 1 to 4, the sections are fastened to each other through a first step of fitting the end fastening portion 16 of the first section 2 on the end fastening portion 24 of the second section 4 in the junction region 6. Thus, in the junction region 6, the inner wall 26, i.e. extending inside the crossbeam 1, of the end fastening portion 16 of the first section 2 is in contact with the outer wall 28, i.e. extending outside the crossbeam 1, of the end fastening portion 24 of the second section 4, while the flare 18 moves away from the outer wall 28 so as to create a space between the outer wall 28 and the end of the end fastening portion 16 of the first section 2. In order to maintain the end fastening portion 16 of the first section 2 on the end fastening portion 24 of the second section 4, the inner diameter of the end fastening portion 16 of the first section is substantially equal to the outer diameter of the end fastening portion 24 of the second section, as shown in FIGS. 2, 3 and 4.

During a second step of fastening the sections to each other, a weld ring 30 is arranged between the outer wall 28 of the end fastening portion 24 of the second section 4 and the inner wall 26 of the end fastening portion 16 of the first section 2, at the flare 18, as shown in FIG. 2. This weld ring 30 has an inner diameter substantially equal to the outer diameter of the end fastening portion 24 of the second section and an outer diameter substantially equal to the largest inner diameter of the flare 18. The weld ring 30 surrounds the entire end fastening portion 24 of the second section 4. The presence of the flare 18 makes it possible to position the weld ring 30 simply by fitting the ring on the end fastening portion 24 of the second section 4 until it abuts against the junction of the flare 18 with the rest of the first section 2.

It is understood that the weld ring 30 may be arranged around the end fastening portion 24 of the second section 4 before or after the end fastening portion 16 of the first section 2 has been fitted on that end fastening portion 24.

According to one embodiment, the end fastening portion 16 of the first section 2 does not comprise a flare 18 at its end. In that case, the weld ring 30 is simply arranged against the end of that end fastening portion 16 around the outer wall 28 of the end fastening portion 24 of the second section 4.

According to a third step, a welding method by induction brazing is carried out on the weld ring 30 so as to form a continuous induction brazing weld 32 filling in the space between the flare 18 and the outer wall 28 of the end fastening portion 24 of the second section 4, as shown in FIGS. 3 and 4. "Continuous weld" 32 means that the weld line 32 goes all the way around the outer wall 28 of the end fastening portion 24 of the second section 4 without interruption. The performance in terms of vibratory behavior of the crossbeam is thus improved.

Induction brazing is a technique known in itself involving melting a filling metal, here formed by the weld ring 30, heated by induction using an inductor (not shown) positioned around the filling metal with a small air gap between the inductor and the filling metal. Melting the filling metal forms the weld 32. Such a method is known in itself and will not be described in detail here. The weld ring 30 is made from a material adapted to perform induction brazing, for example a copper-, silver- or silicon-based alloy. The heating temperature of the filling metal during the welding is for example comprised between 600° C. and 1100° C.

The induction brazing makes it possible to localize the thermal effect necessary to melt the weld ring 30 very precisely, which makes it possible to limit the heating of the materials making up the sections and thereby eliminates deformations of the sections in the junction region 6. The geometry of the sections thus assembled is therefore improved. One thus improves the performance of the crossbeam 1 in terms of rigidity, vibratory behavior, etc. Furthermore, such a method can be used with sections having a small wall thickness T (see FIG. 2), i.e. a small thickness between their inner wall and outer wall. In this way, at least one of the sections 2 and/or 4 for example has a wall thickness T smaller than 1.2 mm. The method therefore makes it possible to lighten the crossbeam 1 by reducing the mass of the materials used to make it and to reduce its bulk.

The presence of the flare 18 at the end of the end fastening portion 16 of the first section 2 makes it possible to improve the fastening of the sections to each other by closely connecting the inner wall 26 of the end fastening portion 16 of the first section 2 to the outer wall 28 of the end fastening portion 24 of the second section 4.

In the embodiment shown in FIGS. 5 and 6, the junction region 6 is formed by a fastening plate 34 on which the first and second sections 2 and 4 are fastened.

The fastening plate 34 is for example formed by two flanges 36, each comprising an opening 38 for receiving the end fastening portion of one of the sections. The receiving openings 38 each extend along the axis of the end fastening portion of the section that is received in said receiving opening 38. The two flanges 36 are fastened to each other such that the positioning of the receiving openings 38 on each flange 36 makes it possible to adopt the position of one of the sections in relation to the other. For example, according to the embodiment shown in FIGS. 5 and 6, the receiving openings 38 are positioned on their respective flanges 36 such that the first section 2 and the second section 4 do not extend opposite one another, but are axially offset in a vertical and/or horizontal direction.

The diameter of each opening 38 is substantially equal to the outer diameter of the end fastening portion of the section that is received in the opening 38, such that the flange 36 is fitted on the outer wall of the end fastening portion of the section it receives.

It will be noted that, according to this embodiment, the inner diameter of the end fastening portion 16 of the first section 2 does not need to be adapted to the outer diameter of the end fastening portion 24 of the second section 4, since the first section 2 is not directly fastened on the second section 4, such that the diameters of the first and second sections 2 and 4 can be chosen completely independently of one another.

According to the embodiments shown in FIGS. 5 and 6, the edge of the receiving opening 38 of a flange comprises a flare 40, widening its diameter, so as to create a space between the flare 40 and the outer wall of the end fastening portion of the section it receives.

A weld ring 30 is arranged around the outer wall of the end fastening portions of each section, for example between the outer wall and the flare 40 of the opening 38, as shown in FIG. 5, and a welding step by induction brazing is carried out so as to form a weld 32, from the weld ring 30, fastening each end fastening portion of the sections to the flange 36 in which it is received, as shown in FIG. 6.

The flanges 36 themselves are welded to each other using a welding method by induction brazing, for example using the weld ring 42 positioned on the periphery of the flanges 36, as shown in FIG. 5, so as to form a weld 44 for securing the periphery of the flanges 36 as shown in FIG. 6.

According to another embodiment, the fastening plate 34 may be made in a single piece.

Figure 7:
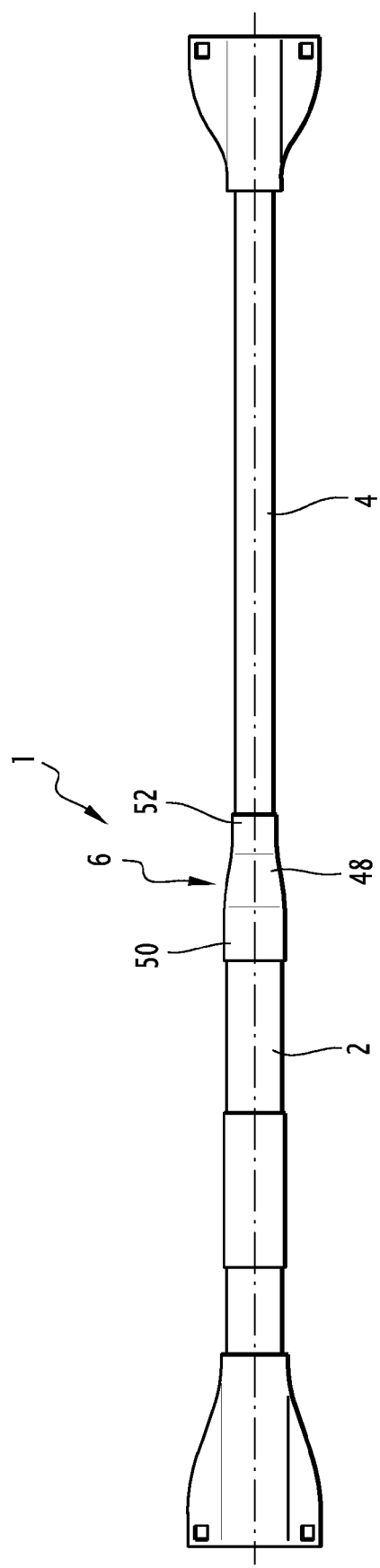
FIG. 7 is a diagrammatic front illustration of a dashboard crossbeam according to one embodiment of the invention.

According to the embodiment shown in FIG. 7, the crossbeam 1 is formed from multiple sections each adapted to the stresses the crossbeam must respect in the region in which the section extends. Thus, each section has a wall thickness and diameter that are adapted to give this section the desired rigidity. Likewise, the sections are each made from a material adapted to impart the desired rigidity while limiting the mass of the obtained crossbeam. Thus, the sections have different wall thicknesses and are made from different materials depending on the region of the crossbeam 1 in which they extend. In that case, the crossbeam 1 comprises a plurality of junction regions 6 in which the crossbeams are fastened to each other by welds made by induction brazing, as described above.

According to one particular embodiment, the first section 2 and the second section 4 can have cross-sections of different shapes, so as to adapt the geometry of the crossbeam 1 to environmental constraints, for example. At the very least, the end fastening portions 16 and 24 can have different cross-sections from each other.

In that case, an additional section 48 is provided in the junction region 6 between the sections with different cross-sections. The additional section 48 comprises a first end portion 50, on the side of the end fastening portion 16 of the first section 2, designed to fit on, or be fitted in, the end fastening portion 16 of the first section 2. The first end fastening portion 50 therefore has a cross-section complementary to the cross-section of the end fastening portion 16 of the first section 2. The additional section 48 comprises a second end portion 52, on the side of the end fastening portion 24 of the second section 4, designed to fit on, or be fitted in, the end fastening portion 24 of the second section 4. The second end fastening portion 52 therefore has a cross-section complementary to the cross section of the end fastening portion 24 of the second section 4. Thus, the additional section 48 makes it possible to fasten two sections to each other having cross-sections of different shapes. The first and second sections 2 and 4 are fastened by welding (not shown) done by induction brazing on the complementary section 48, as previously described.

It is understood that the crossbeam 1 has a shape adapted to its environment. Thus, certain sections may have bent shapes or other shapes. The ends of the crossbeam 1 may have a shape adapted to be fastened on the front hinge pillars of the vehicle, as shown in FIG. 7.

The method for assembling the sections described above is inexpensive and risk-free, induction brazing not causing projections of molten material. Furthermore, it can be used with sections having a smaller thickness, as previously described, while guaranteeing good performance in terms of rigidity, vibratory behavior, and savings in terms of mass and bulk of the crossbeam 1 made by assembling the sections.

The mechanical properties and behavior of the crossbeam 1 can be adjusted precisely by multiplying the number of sections and adapting each of those sections, in terms of dimensions, shape, or material, to the region of the crossbeam in which it extends.

The invention claimed is:

1. A motor vehicle dashboard crossbeam, comprising a first section and a second section extending along parallel axes, a wall of the first section and a wall of the second section being attached at a junction region by an induction brazing weld, wherein each of the first and second sections comprises an end fastening portion extending into the junction region, the first and second sections being attached at the junction region via the respective end fastening portions, wherein the induction brazing weld is continuous and entirely circumscribes the wall of at least one of the sections at the junction region, wherein the end fastening portion of the first section is fitted onto the end fastening portion of the second section, the induction brazing weld extending between said end fastening portions so as to fasten the end fastening portions to each other, and wherein the end fastening portion of the first section comprises a flare at an end thereof such that part of the wall of the second section extends opposite said flare, the weld extending between said flare and said part of the wall.

2. The dashboard crossbeam according to claim 1, wherein the first section has a wall thickness and the second section has a wall thickness different from the wall thickness of the first section.

3. The dashboard crossbeam according to claim 2, wherein at least one of the wall thicknesses is smaller than 1.2 mm.

4. The dashboard crossbeam according to claim 1, wherein the first section is made from a first type of material and the second section is made from a second type of material different from the first type of material.

5. The dashboard crossbeam according to claim 1, wherein each end fastening portion is fastened to a fastening plate by at least one induction brazing weld at the junction region.

6. The dashboard crossbeam according to claim 5, wherein the fastening plate comprises two flanges fastened to each other by an induction brazing weld, each flange comprising an opening for receiving the end fastening portion of one of the sections, the end fastening portion of each section being fastened in one of the openings by at least one induction brazing weld.

7. The dashboard crossbeam according to claim 1, wherein the end fastening portion of the first section has a first cross-section and the end fastening portion of the second section has a second cross-section different from the first cross-section, the crossbeam comprising an additional section at the junction region, said additional section having a first end fastening portion with a cross-section complementary to said first cross-section and a second end fastening portion with a cross-section complementary to said second cross-section, the first and second sections being fastened to the additional section by induction brazing welds.

8. The dashboard crossbeam according to claim 1, wherein the sections are substantially tubular and coaxial.

9. The dashboard crossbeam according to claim 1, wherein the sections are substantially tubular and the parallel axes are non-aligned axes.

10. A method for producing a dashboard crossbeam, said method comprising:

attaching a wall of a first crossbeam section to a wall of a second crossbeam section at a junction region by an induction brazing weld such that the first and second crossbeam sections extend along parallel axes, wherein each of the first and second crossbeam sections comprises an end fastening portion extending into the junction region, the first and second crossbeam sections being attached at the junction region via the respective end fastening portions, wherein the induction brazing weld is continuous and entirely circumscribes the wall of at least one of the crossbeam sections at the junction region, wherein the end fastening portion of the first crossbeam section is fitted onto the end fastening portion of the second crossbeam section, the induction brazing weld extending between said end fastening portions so as to fasten the end fastening portions to each other, and wherein the end fastening portion of the first crossbeam section comprises a flare at an end thereof such that part of the wall of the second crossbeam section extends opposite said flare, the weld extending between said flare and said part of the wall.

11. The method according to claim 10, wherein the step of attaching comprises:

arranging a weld ring around the end fastening portion of the second crossbeam section at the junction region; and melting said weld ring to make the weld, thereby fastening the first and second crossbeam sections together at the junction region.

12. A motor vehicle dashboard crossbeam, comprising a first section and a second section, a wall of the first section and a wall of the second section being attached at a junction region by an induction brazing weld, wherein each of the first and second sections comprises an end fastening portion extending into the junction region, the first and second sections being attached at the junction region via the respective end fastening portions, wherein the end fastening portion of the first section is fitted onto the end fastening portion of the second section, the induction brazing weld extending between said end fastening portions so as to fasten the end fastening portions to each other, and wherein the end fastening portion of the first section comprises a flare at an end thereof such that part of the wall of the second section extends opposite said flare, the weld extending between said flare and said part of the wall.

13. The dashboard crossbeam according to claim 12, wherein the first section has a wall thickness and the second section has a wall thickness different from the wall thickness of the first section.

14. The dashboard crossbeam according to claim 12, wherein the first section is made from a first type of material and the second section is made from a second type of material different from the first type of material.

15. The dashboard crossbeam according to claim 12, wherein each end fastening portion is fastened to a fastening plate by at least one induction brazing weld at the junction region.

16. The dashboard crossbeam according to claim 15, wherein the fastening plate comprises two flanges fastened to each other by an induction brazing weld, each flange comprising an opening for receiving the end fastening portion of one of the sections, the end fastening portion of each section being fastened in one of the openings by at least one induction brazing weld.

17. The dashboard crossbeam according to claim 12, wherein the end fastening portion of the first section has a first cross-section and the end fastening portion of the second section has a second cross-section different from the first cross-section, the crossbeam comprising an additional section at the junction region, said additional section having a first end fastening portion with a cross-section complementary to said first cross-section and a second end fastening portion with a cross-section complementary to said second cross-section, the first and second sections being fastened to the additional section by induction brazing welds.

18. The dashboard crossbeam according to claim 12, wherein the sections are substantially tubular and coaxial.

19. The dashboard crossbeam according to claim 12, wherein the sections are substantially tubular and extend along non-aligned parallel axes.

20. The dashboard crossbeam according to claim 12, wherein the induction brazing weld is continuous and entirely circumscribes the wall of at least one of the sections at the junction region.

* * * * *